(12) United States Patent
Brunone

(10) Patent No.: US 7,866,463 B2
(45) Date of Patent: Jan. 11, 2011

(54) BELT CONVEYOR COMPRISING SUPPORT STATIONS SPACED AT A DISTANCE FROM ONE ANOTHER

(76) Inventor: René Brunone, 46, rue du Général Leclerc, 27950, Saint Marcel (FR)

( * ) Notice: Subject to any disclaimer, the term of this patent is extended or adjusted under 35 U.S.C. 154(b) by 0 days.

(21) Appl. No.: 12/379,100

(22) Filed: Feb. 12, 2009

(65) Prior Publication Data
US 2009/0200142 A1    Aug. 13, 2009

(30) Foreign Application Priority Data
Feb. 13, 2008    (FR)    ................... 08 50902

(51) Int. Cl.
*B65G 15/40*    (2006.01)
(52) U.S. Cl. ...................... 198/819; 198/823
(58) Field of Classification Search ............... 198/819, 198/820, 821, 823, 824
See application file for complete search history.

(56) References Cited

U.S. PATENT DOCUMENTS

| 3,442,369 | A | * | 5/1969 | Harkess ............... 198/819 |
| 4,850,476 | A | * | 7/1989 | Yoshida ............... 198/819 |
| 5,246,102 | A | * | 9/1993 | Rappen et al. ........ 198/819 |
| 5,860,510 | A | | 1/1999 | Becker |
| 6,029,801 | A | * | 2/2000 | Odin et al. ........... 198/819 |
| 6,540,069 | B2 | * | 4/2003 | Tschantz ............. 198/819 |
| 2007/0235289 | A1 | | 10/2007 | Brunone |

FOREIGN PATENT DOCUMENTS

| DE | 198 15 580 | | 10/1999 | |
| EP | 0 371 180 | | 6/1990 | |
| EP | 0 516 626 | | 12/1992 | |
| FR | 2559745 | * | 8/1985 | ............... 198/819 |
| FR | 2 871 452 | | 12/2005 | |
| JP | 01-98510 | | 4/1989 | |
| JP | 11-334825 | | 12/1999 | |
| JP | 2003-292131 | | 10/2003 | |
| WO | 95/11848 | | 5/1995 | |

OTHER PUBLICATIONS

French Search Report issued Oct. 2, 2008 in the corresponding French application.
Hern, "Long-Distance Transport with Roller Belt Conveyors Which Conform to the Terrain," ZKG International, Bauverlag BV., Tersloh, DE, vol. 46, No. 7, Jul. 1993, pp. 376-378.

* cited by examiner

*Primary Examiner*—James R Bidwell
(74) *Attorney, Agent, or Firm*—Wenderoth, Lind & Ponack, L.L.P.

(57) ABSTRACT

The invention relates to a belt conveyor including a longitudinal conveyor belt and a plurality of stations for supporting the conveyor belt distributed longitudinally along the conveyor belt. The conveyor belt includes a matrix made of a resilient material and a frame embedded in the matrix, and at least some support stations each including a support member for supporting the belt and a framework supported on the ground. The support member is fixed on the framework at a height greater than two meters relative to the ground. The support stations are spaced far apart from one another. The conveyor does not comprise a device for supporting the belt between stations.

16 Claims, 5 Drawing Sheets

US 7,866,463 B2

BELT CONVEYOR COMPRISING SUPPORT STATIONS SPACED AT A DISTANCE FROM ONE ANOTHER

FIELD OF THE INVENTION

The present invention generally relates to belt conveyors.

More precisely, the invention relates, according to a first feature, to a belt conveyor of the type comprising a longitudinal conveyor belt and a plurality of stations for supporting the conveyor belt distributed longitudinally along said conveyor belt.

BACKGROUND OF THE INVENTION

It is known, in mining quarries or at mining locations, to use belt conveyors of this type in order to transport mined rock or ores. This transportation may take place over relatively long distances which may stretch over tens of kilometers.

In a conveyor of this type, the belt is supported almost continuously. The support stations constitute a significant portion of the total cost of the conveyor.

Furthermore, in order for this conveyor to cross stretches of water it is necessary to put specific means in place, such as floating frameworks fitted with means for supporting the conveyor belt. Frameworks of this type are disclosed in the application filed under number FR 02 00 222. The floating frameworks are expensive. Alternatively, the belt may be provided so as to float on the surface of the stretch of water.

In this context, the object of the invention is to provide a belt conveyor which is less expensive, makes it possible to cross stretches of water and other obstacles at a reduced cost and does not require the belt to be supported virtually continuously.

SUMMARY OF THE INVENTION

The invention thus relates to a conveyor of the aforementioned type, wherein the conveyor belt comprises a matrix made of a resilient material and a frame embedded in the matrix. At least some support stations each comprise means for supporting the belt and a framework supported on the ground, the support means being fixed on the framework at a height greater than two meters relative to the ground.

The belt may also have one or more of the following features, taken in isolation or in any technically feasible combination.

At least half the support stations each comprise means for supporting the belt and a framework supported on the ground, the support means being fixed on the framework at a height greater than two meters relative to the ground.

At least two consecutive adjacent support stations are separated longitudinally along the belt at a distance of at least 20 meters.

At least half the support stations are each separated from a respective adjacent support station at a longitudinal distance along the belt of at least 20 meters.

At least half the support stations each comprise means for supporting the belt and a framework supported on the ground, the support means being fixed on the framework at a height greater than five meters relative to the ground.

At least half the support stations are each separated from a respective adjacent support station at a longitudinal distance along the belt of at least 20 meters.

The frame of the belt comprises longitudinal metal cables.

The frame of the belt comprises transverse metal cables.

The frame of the belt comprises a fabric made of plastics material.

Over the majority of its longitudinal length, the belt has a cross-section which is closed perpendicular to the longitudinal direction.

The means for supporting the belt comprises a plurality of sets of rollers. The sets are distributed longitudinally along the belt, each set comprising at least one roller distributed about the circumference of the belt.

The means for supporting the belt comprises at least ten of the sets of rollers distributed longitudinally along the belt.

The sets of rollers are vertically staggered relative to one another along an upwardly convex longitudinal curve.

Some rollers are motorized.

The belt is self-supporting.

The conveyor belt is configured as a closed loop and has a conveying side and a return side. The conveyor comprises at least one station for loading the conveyor side with material to be transported and an unloading station. The conveyor further comprises a second station for loading the return side with material to be transported and a second station for unloading the return side.

According to a second embodiment, the invention relates to the use of a belt conveyor having the above features for crossing an obstacle, such as a stretch of water. The conveyor comprises two consecutive support stations along the belt arranged on either side of the obstacle. The two support stations each comprise means for supporting the belt and a framework supported on the ground, and the support means is fixed on the framework at a height greater than two meters relative to the ground.

Other features and advantages of the invention will emerge from the detailed description which is given below in a purely indicative and non-limiting manner, with reference to the appended drawings.

DETAILED DESCRIPTION OF THE PREFERRED EMBODIMENTS

Figure 1A:
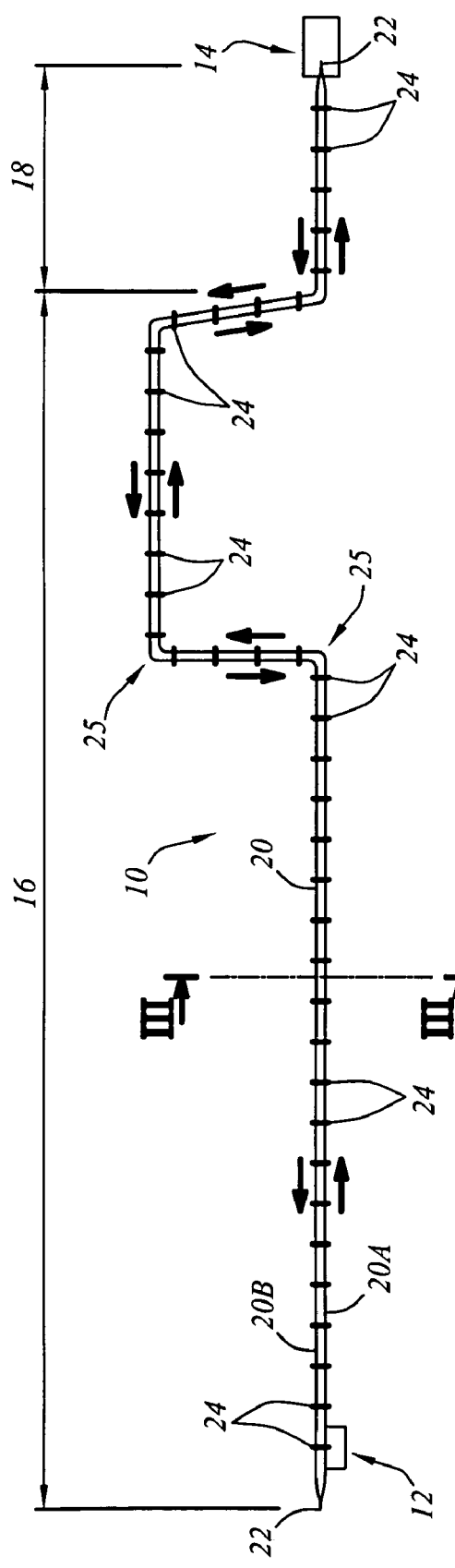
FIGS. 1A and 1B are views from above and from the side, respectively, of a conveyor according to the invention.
Figure 1B:
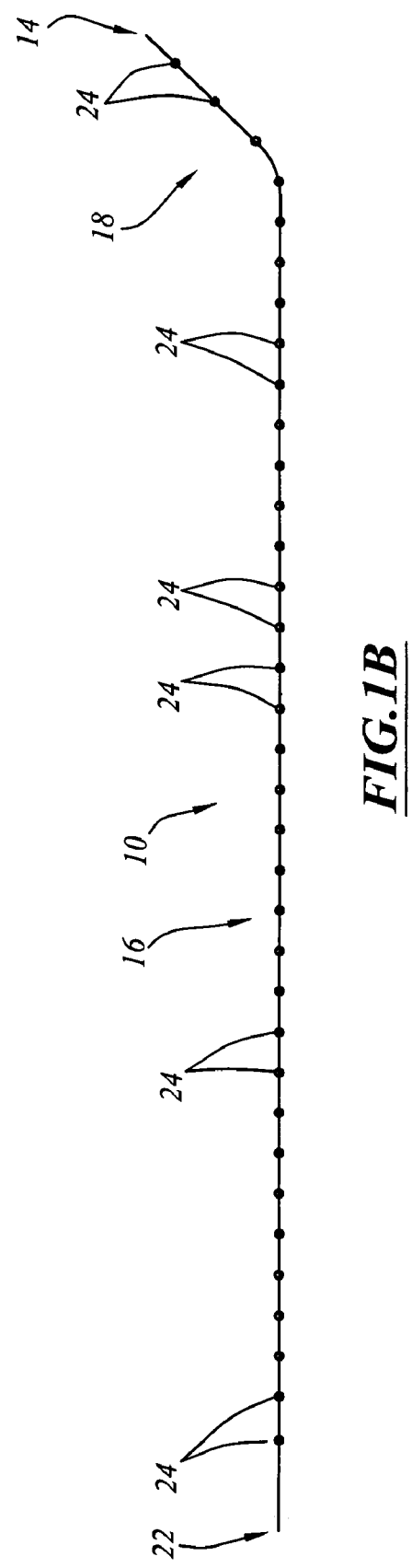

The conveyor 10 shown in FIGS. 1A and 1B is used to transport materials, in particular loose, finely-divided materials, such as gypsum, sand, gravel, granular material or the like, over a large distance which may stretch over tens of kilometers. The transportation is carried out between at least a loading station 12 and an unloading station 14. The direction of transportation is shown by arrows in FIG. 1A.

In the embodiment shown, the conveyor extends over a substantially planar stretch 16, then over a slope 18 having a steep incline, the unloading station being arranged at the peak of the slope 18. The conveyor 10 comprises a belt 20 which is configured as a closed loop and has a conveying side for conveying materials 20A and an empty return side 20B extending generally parallel to one another along the transportation path of the conveyor. The belt is held from its ends between two return rollers 22, of which one is arranged in the unloading station 14 for example, and the other is arranged upstream of the loading station 12 for example.

The conveyor 10 also comprises a plurality of stations 24 for supporting the conveyor belt which are distributed longitudinally along the conveyor belt 20. The belt 20 rests and is displaced relative to the support stations 24. Some stations comprise a device for driving at least one side of the belt. The stations fitted with drive devices are distributed along the length of the belt. In the embodiment shown in FIGS. 1A and 1B, the path of the belt has bends 25. The stations fitted with drive devices are arranged, for each side of the belt, at least immediately upstream of the bends 25 for example, taking into consideration the direction of movement of the side concerned.

Figure 2A:
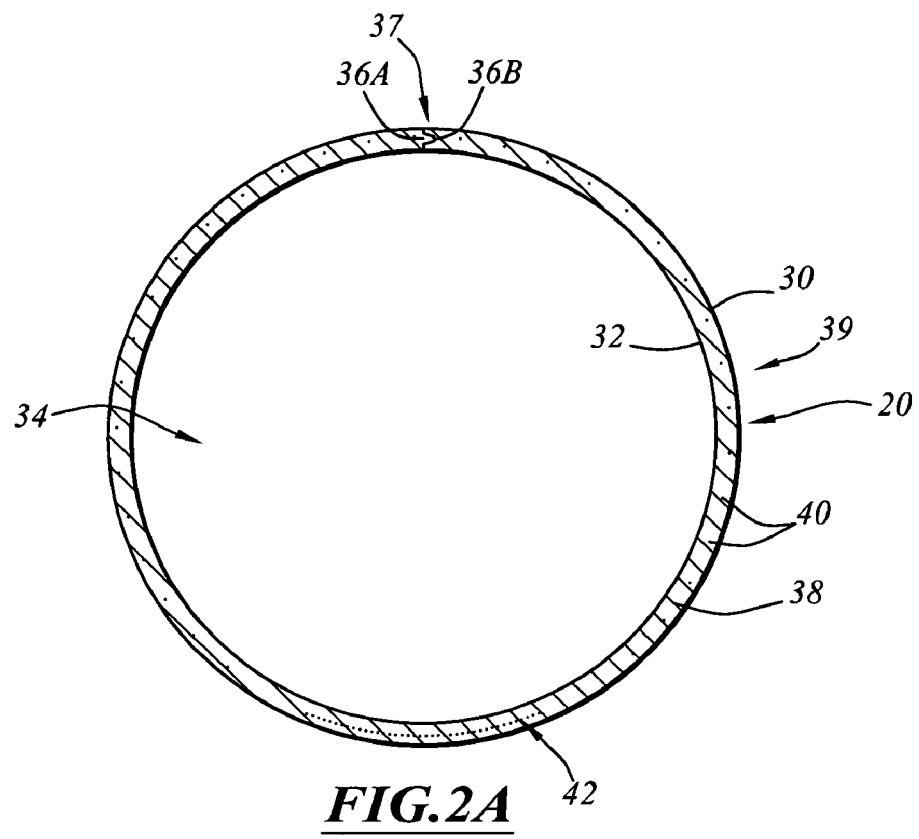
FIGS. 2A and 2B are a cross-section and a perspective view, respectively, of a portion of the belt conveyor shown in FIGS. 1A and 1B.
Figure 2B:
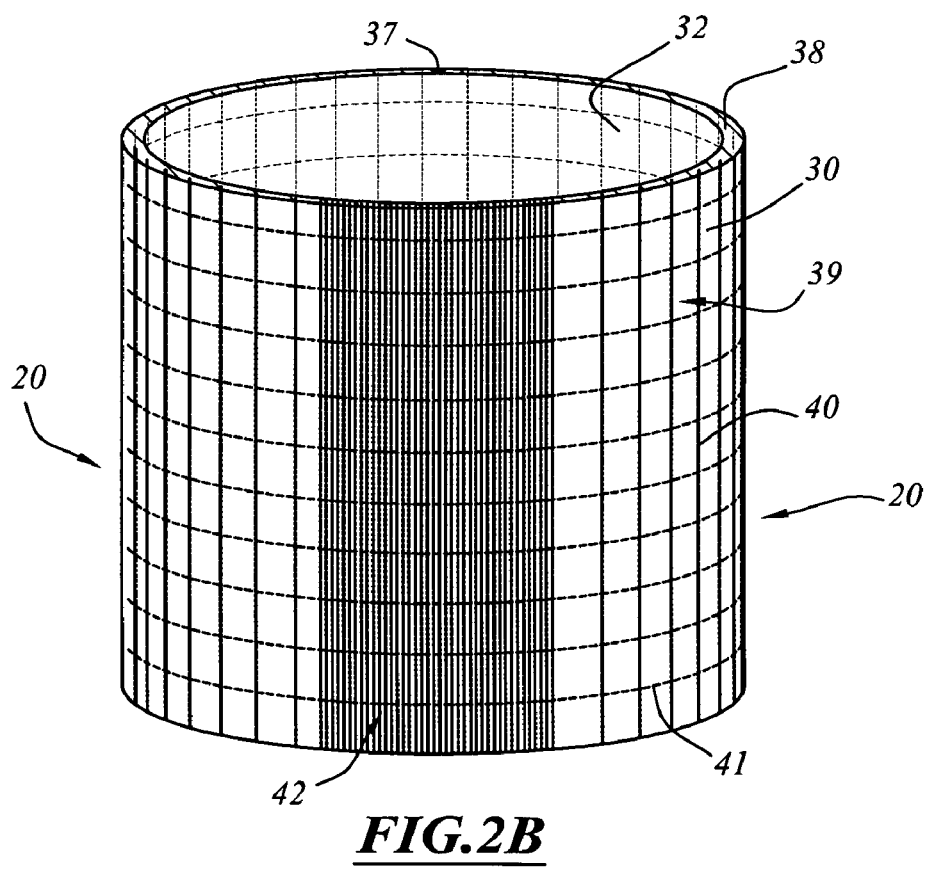

As shown in FIGS. 2A and 2B, the belt 20 has a generally rounded tubular shape. Over the majority of its longitudinal length, it has a cross-section which is closed perpendicular to the longitudinal direction.

More precisely, the belt 20 has an outer face 30 and an inner face 32 which delimits a face for supporting goods to be transported. The belt thus delimits a tubular enclosed space confining the goods to be transported. The enclosed space generally has an annular cross-section, the belt being cylindrical in shape. The perimeter of the belt is advantageously between 0.5 meter and 3 meters. For example, it is such that the diameter of the enclosed space 34 delimited by the belt is substantially equal to 0.40 meters and preferably between 0.2 and 1 meter.

The belt is split longitudinally, the two edges denoted 36A and 36B of the belt being joined together and defining therebetween a longitudinal slit 37 which is normally closed. The two edges 36A and 36B may, for example, overlap. In a variation, the edge 36A has a projecting (convex) part forming a tongue, whereas the edge 36B has, along its width, a complementary hollow (convex) portion forming a groove and able to receive the portion projecting from the edge 36A. This mortise and tenon coupling is suitable for ensuring that the belt is sufficiently tight.

In the absence of excessive external pressure and in the absence of loading due to the material contained within the space 34 greater than a pre-determined value, the belt is self-supporting. It maintains a rounded tubular shape and is preferably substantially annular.

The belt 20 generally comprises a matrix 38 made of a resilient material and a frame 39 embedded in the matrix. The matrix 38 is typically made of synthetic or natural rubber.

The belt is produced in portions. Each portion is shaped around a cylindrical core then cured in the shape of a cylinder around the core. Production is carried out continuously, each new portion being molded and cured so as to form an extension of the belt portion already produced. Each new portion is thus produced so as to be directly integral with the portion already made. Curing is carried out with the frame embedded in the matrix. The frame is arranged in the matrix before or during the shaping process.

In a variation, the matrix is made of PVC.

The frame 39 of the belt comprises longitudinal metal cables 40. The cables 40 are typically made of steel and have a low elongation under load value, for example by 0.2 to 0.3%. The cables extend over the entire length of the belt 20. They are typically distributed at regular intervals over the circumference of the belt. The frame 39 may, in addition to the longitudinal cables 40, comprise transverse metal cables 41. These cables 41 are typically made of steel. They extend circumferentially over the majority of the perimeter of the belt. For example, a first end of transverse cable 41 is arranged in the vicinity of the edge 36A, the end remote from the side 41 being arranged in the vicinity of the edge 36B. The cables 40 and 41 are, for example, interlaced with one another in accordance with a pre-determined system.

In a variant, the frame 39 may comprise, instead of transverse cables, a fabric made of plastics material, for example a fabric consisting of high-strength plastics material fibers, such as polyamide fibers.

The lower portion 42 of the belt is reinforced with a greater density of longitudinal reinforcement cables 40. The portion 42 is the region circumferentially opposite the longitudinal slit 37. It supports the weight of the transported materials and is subjected to greater stresses than the rest of the belt.

The support stations 24 each comprise a support member 44 for supporting the belt and a framework 46 supported on the ground. The support member are fixed on the respective framework at a height greater than two meters relative to the ground, preferably greater than five meters and for example ten meters.

The height of the support members must be lower than a pre-determined threshold dictated by legal, meteorological (height is calculated so as to withstand a ten-year or one hundred-year storms for example), architectural and/or economical constraints. The maximum height is, for example, 50 meters.

Typically, two consecutive support stations 24 along the belt are separated by a longitudinal distance measuring between 20 and 500 meters, preferably between 70 and 200 meters and typically 100 meters.

The distance between two consecutive support stations 24 and the height of the support members 44 of each station 24 are determined precisely as a function of the nature and relief of the ground, the obstacles to be crossed, the diameter of the belt, the weight of the belt per unit of length thereof, and the weight of the goods to be transported per unit of length of the belt. For a belt weighing 40 kilos per meter and loaded with 60 kilos of goods per meter, a distance of 100 meters between two consecutive support stations is thus acceptable. The obstacles to be crossed may be natural (hills, forests, stretches or bodies of water), or constructions (buildings) or roads.

In addition, the exact height of the support members 44 of a station is determined precisely as a function of the longitudinal distance along the belt between the support station and the stations arranged immediately before and immediately after the station along the belt. The greater the distance between two adjacent stations, the greater the height at which the support member will be fixed on the framework relative to the ground, since the belt sags more between the two stations.

Conversely, the height of the support member may, in some cases, be strictly limited for legal reasons so as to limit the risk of the support station falling down as a result of natural phenomena (winds, storms), so as to be better integrated into the surroundings or so as to reduce the cost of the framework, as described above. In this case, the distance between adjacent support stations is selected so as to be able to keep the support member below a specified maximum height.

Figure 4:
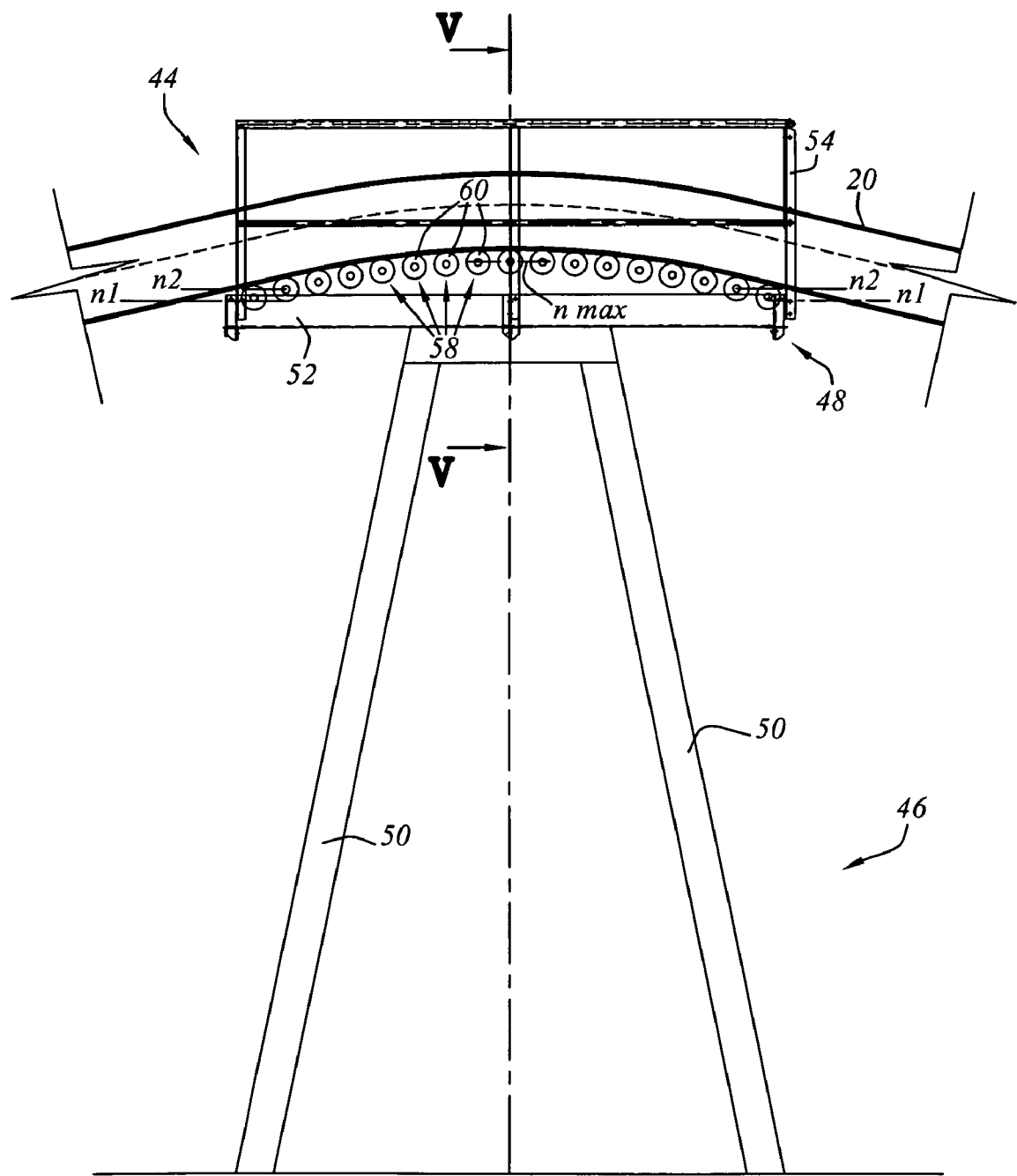
FIG. 4 is a longitudinal sectional view of a station for supporting the belt.
Figure 5:
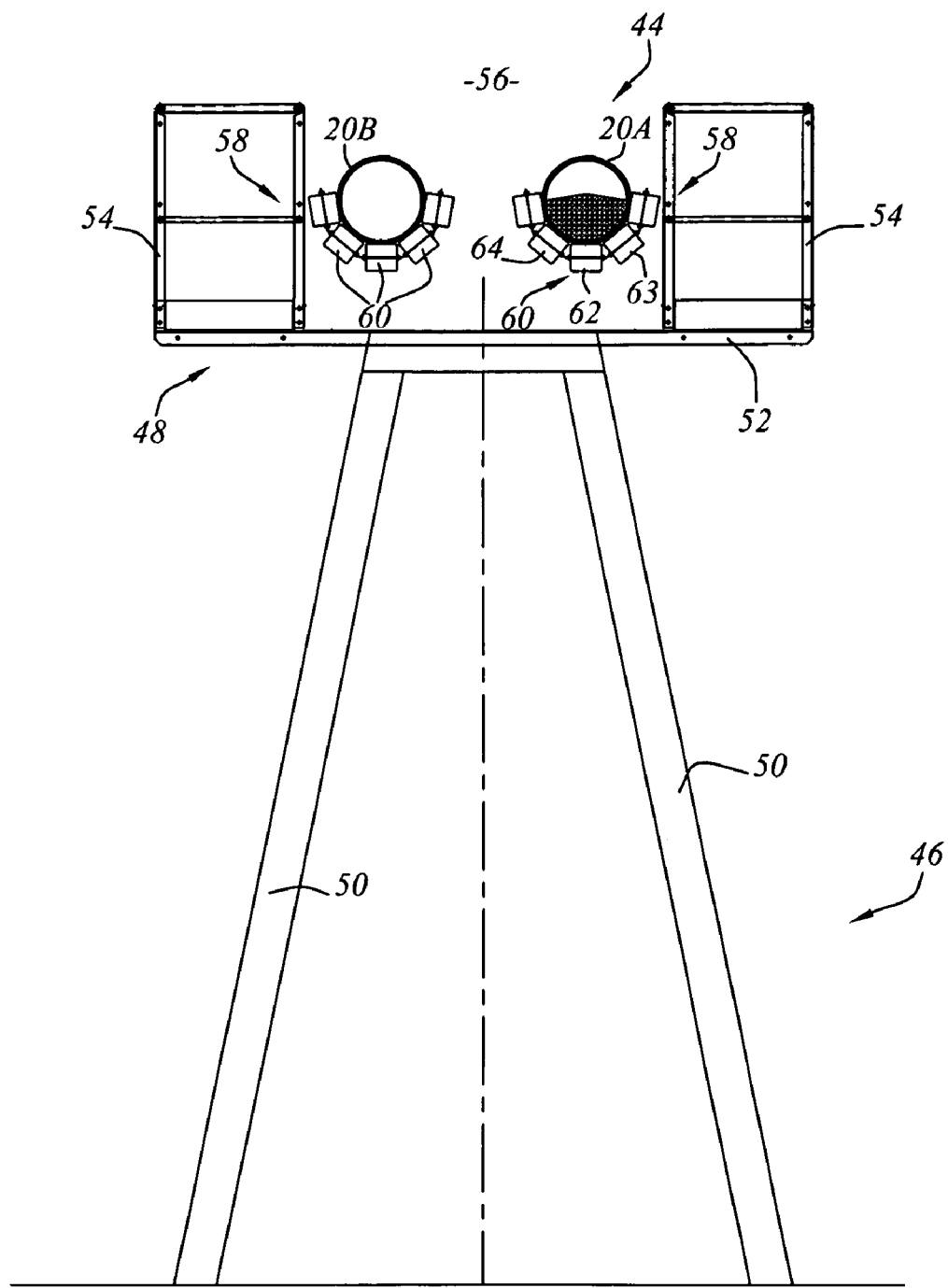
FIG. 5 is a cross-section of the support station shown in FIG. 4, from the angle denoted by the arrows V.

As can be seen in FIGS. 4 and 5, the framework 46 comprises a housing 48 and poles 50 for supporting the housing. The housing 48 is integral with the upper end of the poles. The housing 48 comprises a platform 52 carrying two lateral structures 54 delimiting therebetween a longitudinal circulation path 56 of the belts. The two sides of the belt 20A and 20B are arranged side by side in the path 56. The lateral structures 54 are provided so as to be able to service the member 44 for supporting the belt.

The support member 44 comprises, for each of the two sides 20A and 20B, a plurality of sets 58 of rollers 60 distributed longitudinally along the corresponding side. Each roller set 58 forms a cradle for supporting and driving a longitudinal portion of the side 20A or 20B.

Each roller set 58 comprises at least four rollers, preferably five rollers 60. The rollers 60 are distributed circumferentially along the lower half of the perimeter of the belt. The rollers 60 are mounted so as to be able to rotate freely relative to a support structure (not shown), and the support structure is rigidly fixed to the housing 48.

The support member 44 for supporting the conveying side 20A comprise a group of at least ten roller sets 58 distributed longitudinally along the side. The member for supporting the side 20A preferably comprises a group of at least 15 roller sets 58 and typically comprises 20 roller sets 58 spaced longitudinally at regular intervals from one another. Each of the roller sets 58 comprises five rollers.

So as to drive the belt and confer a suitable longitudinal profile to the side 20A, the sets of rollers 58 are vertically staggered relative to one another along an upwardly convex longitudinal curve which can be seen in FIG. 4.

The two sets 58 arranged in the foremost upstream position and the farthest downstream position are arranged at a first height n1 relative to the ground. The roller set 58 arranged in the second foremost upstream position is arranged at a height n2 which is slightly higher than the height n1. Likewise, the set 58 arranged second farthest downstream is arranged at the same height n2. The set 58 arranged in the third foremost upstream position is arranged at a height n3 which is higher than the height n2, and so on. Likewise, the set 58 arranged third farthest downstream is at the height n3, and so on. The set or the two sets arranged longitudinally in the center of the group is/are arranged at a height Nmax which is higher than the height of the other sets of rollers. When the sets of rollers are viewed from the upstream end to the downstream end it is thus observed that the height of the sets of rollers increases until the sets of rollers arranged longitudinally in the center of the group of all the rollers is reached, then decreases towards the downstream end.

In this instance, the height of a set of rollers means, for example, the heights relative to the ground of the axis of rotation of the roller 60 arranged in the lowermost position.

In addition, the height of the support member for supporting the belt means the height of the highest set of rollers within the roller sets 58 supporting the side 20A.

The sets 58 may be staggered in a different shape, for example as a function of the slope of the ground along the path of the belt. If the ground rises from the upstream end towards the downstream end the sets 58 may be arranged at ever-increasing heights from the upstream end towards the downstream end. Conversely, if the ground descends from the upstream end towards the downstream end the sets 58 may be arranged at ever-decreasing heights from the upstream end towards the downstream end.

The return side 20B of the belt is supported in the same manner by a plurality of roller sets 58 of rollers, each set comprising at least four rollers, preferably five. Each support station may comprise the same number of roller sets 58 for the sides 20A and 20B. However, if the return side 20B is not loaded with goods to be transported, it is possible for a lower number of sets 58 to be provided for the return side 20B than for the conveying side 20A. The support member 44 may, for example, only comprise 15 sets 58 for the side 20B and 20 sets 58 for the side 20A. Likewise, the support member 44 may comprise 10 sets 58 for the side 20B and 15 sets 58 for the side 20A.

As mentioned above, some support stations may comprise a device for driving the belt. The device may be provided for driving the conveying side 20A of the belt, or the return side 20B or both.

These devices, not shown, typically comprise three sets of motor reducers which are rigidly fixed to and housed in a lateral structure 54. The three motor reducers are provided so as to drive in rotation each of the four rollers belonging to four consecutive roller sets 58 along the belt. One of the motor reducers drives the driven rollers 62 arranged circumferentially in the center of the corresponding sets 58, for example vertically below the belt in the embodiment shown in FIG. 5. A further motor reducer is provided so as to drive four other rollers 63 belonging to the same sets 58 as the rollers 62. Each roller 63 is arranged peripherally to the right of a roller 62.

The third motor reducer is provided so as to drive four rollers 64 belonging to the same sets as the rollers 62. The rollers 64 are arranged immediately to the left of the rollers 62 in the embodiment shown in FIG. 5. The three rollers arranged beneath the lower portion of the belt are thus motorized so as to effectively drive the belt.

The device for driving the same side of the belt are arranged in support stations separated approximately one kilometer from one another along the belt. The support stations arranged between two motorized support stations for a side are not provided with a device for driving the side concerned.

The loading station 12 and unloading station 14 are of the type disclosed in the patent application filed under number FR 04 06 249. They will not be described hereinafter in more detail.

Figure 3:
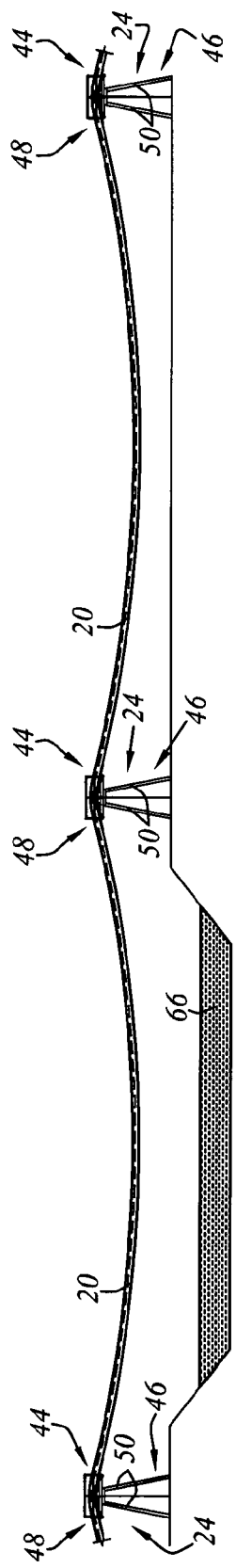
FIG. 3 is a side view of a portion of the conveyor shown in FIGS. 1A and 1B showing two stations for supporting the belt arranged on either side of a stretch of water in such a way as to make it possible for the belt to cross the stretch of water.

The use of a conveyor as described above is particularly advantageous when the conveyor must cross an obstacle, such as a stretch of water 66 (see FIG. 3). The obstacle 66 is, for example, a stream, a river, a reservoir, a lake, etc. In this case, two consecutive support stations 24 along the belt are arranged with one on one side of the obstacle and the other on the opposite side. The height relative to the ground of the support member 44 for supporting the belt at the two stations is selected, inter alia, as a function of the width of the obstacle along the path of the belt. It is not necessary to provide a support member for supporting the belt at an intermediate point between the two support stations of the floating framework type mentioned hereinbefore.

The belt conveyor described above has many advantages.

Since the conveyor belt comprises a matrix made of a resilient material and a frame embedded in the matrix, and since at least some station supports each comprise support members for supporting the belt and a framework supported on the ground, and the support member is fixed on the framework at a height greater than two meters relative to the ground, it is possible to space the support stations at a significant distance from one another. The conveyor consequently comprises a lower number of support stations over a specific length. The belt also does not need to be supported in a virtually continuous manner, as is the case with conveyors known from the prior art. This reduces the cost of the conveyor.

It is thus possible to provide two consecutive support stations along the belt with a distance of 100 meters, or even 200 meters or more therebetween.

The conveyor may consequently be used to cross stretches of water of considerable width without having to arrange floating means for supporting the belt on the water. Owing to the absence of the floating support means, the cost of the conveyor is considerably reduced.

Likewise, the conveyor may be used to cross obstacles in cases where it is not easy to install stations for supporting the belt in the middle of the obstacles. These stretches are, for example, office or housing areas, wide motorways or building or work sites.

The fact that the frame of the belt comprises longitudinal metal cables makes it possible for the belt to be sufficiently rigid to limit sagging of the belt between two support stations. The amount of sagging acceptable is a function of the height at which the support member for supporting the belt are arranged in the support stations. The higher the support member, the greater the amount of sagging which is acceptable and the greater the distance between two consecutive support stations may be.

In addition, one possibility for limiting sagging of the belt involves selecting a belt having a greater number of longitudinal metal cables so as to increase the rigidity of the belt. This also makes it possible to increase the load which may be transported.

Likewise, if the frame comprises transverse metal cables this helps to increase both the rigidity of the belt and the load which may be transported thereby. In a variant, the transverse metal cables may be replaced with a fabric made of plastics material which makes it possible to reduce the weight of the belt per unit of length.

The fact that the belt has a closed cross-section helps to increase the rigidity of the belt and makes it possible to avoid finely-divided materials, which are being transported by the belt, being cast into the air.

It is particularly important to ensure that the belt is supported and guided over a significant portion of its periphery and over a significant longitudinal length at each support station. This helps to increase the distance between the support stations. This object is achieved by using, for example, sets of four rollers distributed circumferentially, each support station comprising at least ten sets of this type.

The sets are preferably vertically staggered relative to one another so as to fit the longitudinal profile of the belt. This helps to achieve particularly effective support and guidance since all the rollers simultaneously abut the belt. This also makes it possible to correct, in part, the longitudinal profile of the belt and influences the distance between the support stations.

Since it is possible to motorize the rollers of some support stations, the belt conveyor may be rather long. The conveyor may be used over flat ground, for example over the stretch 16 shown in FIGS. 1A and 1B. It may also extend over steep slopes (region 18 in FIGS. 1A and 1B) as long as the distance between the support stations and the height of the support members at each station have been correctly calculated.

There may be numerous variations of the belt conveyor.

It is not necessary for all the support stations of the conveyor to be fitted with support members for supporting the belt arranged at heights greater than five meters relative to the ground. It is possible for only some stations to be fitted with support members arranged at such heights. For example, only a small number of stations may be fitted with support members arranged higher than five meters from the ground with a view to making it possible to cross obstacles, such as stretches of water. Alternatively, the majority of support stations may be fitted with support members arranged higher than five meters from the ground with a view to reducing the number of support stations necessary along the path of the belt. For example, all the support stations are fitted with support members arranged higher than five meters.

The support members for supporting the belt are not necessarily arranged at the same height in all support stations. They may be arranged at different heights as a function of the distance between the support stations and as a function of the obstacles to be crossed between the support stations. Therefore, if the belt must pass above construction or trees for example, the support stations in the corresponding region may be provided with members for supporting the belt arranged at greater heights relative to the ground. It is possible for the two sides of the belt to be arranged at different heights relative to the ground in some or all support stations. In fact, the return side is not loaded and will sag less between two stations and may therefore be arranged slightly lower than the conveyor side.

The support stations may be separate for the conveyor side and the return side of the belt. The conveyor side may thus be supported by a plurality of stations which are dedicated thereto and the return side may be supported by other stations which, likewise, are dedicated thereto but are separate from the stations supporting the conveyor side. This is the case, in particular, when the belt follows a looped path, the path of the conveyor side being different to the path of the return side.

The number of longitudinal and transverse metal cables may vary and depends on the desired rigidity of the conveyor belt.

The belt does not necessarily have an annular cross-section. It may have an oval cross-section or any other shaped cross-section.

In a variant which is not preferred, the belt does not have a closed cross-section but has an open cross-section, for example a deep trough.

The belt conveyor does not necessarily extend over a planar stretch but may extend over a hilly stretch, the conveyor crossing a plurality of peaks and/or valleys along its path.

The loading and unloading stations are not necessarily arranged at the ends of the conveyors, at the return rollers or in the vicinity thereof. They may be arranged at any intermediate point between the rollers. The conveyor may comprise a plurality of loading and/or unloading stations.

The return side does not necessarily operate empty but may, in contrast, transport materials. In this case, the conveyor comprises at least a second loading station and a second unloading station associated with the return side. In this case, the conveyor comprises a device for guiding and twisting the return side between the return roller 22 arranged downstream of the conveyor side, i.e. at the start of the return side, and the station for loading the return side. In fact, at the end of the return roller 22, the longitudinal slit 37 of the return side is facing downwards. The guiding and twisting devices are able to drive the slit 37 upwards and arrange the return side substantially in the same plane as the conveyor side.

The device for driving the belt may only drive one or two rollers within a given set of rollers. Conversely, the drive device may drive four rollers or more. The drive device may drive all the rollers in a set.

The drive device may drive in rotation rollers belonging to more or less than four sets of rollers, even each set of rollers.

In a specific embodiment of the belt conveyor, the belt is hundreds of meters long between the two return rollers, for example three to four hundred meters long. In this case, the conveyor does not comprise any support stations between its return rollers. In this case the rollers form the two single stations for supporting the belt of the conveyor.

What it is claimed is:

1. A conveyor comprising:
    a longitudinal conveyor belt comprising a matrix made of a resilient material and a frame embedded in said matrix; and
    a plurality of support stations for supporting said conveyor belt, said support stations being distributed along a longitudinal axis of said conveyor belt such that an adjacent pair of said support stations are separated from each other by a distance of at least 20 meters, said conveyor belt being self-supporting so as to be free of any intermediate support devices between adjacent pairs of said support stations, at least two of said support stations each includes:
        a support member having a cradle for supporting said conveyor belt; and
        a framework supported on the ground and comprising a pole, said support member being fixed on said respective framework at a height greater than two meters above the ground, said cradle of said support member being rigidly fixed to said pole;
    wherein said conveyor belt is configured to have a annularly-closed cross-section along at least a majority of the entire length of said conveyor belt, and to have an upper zone and a lower zone, said lower zone of said conveyor belt resting on said cradle of said support member.

2. The conveyor according to claim 1, wherein at least half of said support stations each comprise a support member for supporting said conveyor belt and a framework supported on the ground, said support member of each of said at least half of said support stations being fixed on said framework at a height greater than two meters above the ground.

3. The conveyor according to claim 2, wherein at least half of said support stations are each separated from a respective adjacent support station by a distance of at least 20 meters.

4. The conveyor according to claim 1, wherein at least half of said support stations are each separated from a respective adjacent support station by a distance of at least 20 meters.

5. The conveyor according to claim 1, wherein at least half of said support stations each includes:
    a support member for supporting said conveyor belt; and
    a framework supported on the ground, said support member being fixed on said respective framework at a height greater than five meters above the ground.

6. The conveyor according to claim 1, wherein said frame of said conveyor belt comprises longitudinal metal cables distributed around a circumference of said conveyor belt.

7. The conveyor according to claim 6, wherein said longitudinal cables comprise steel cables which stretch under load by between 0.2% and 0.3%.

8. The conveyor according to claim 1, wherein said frame of said conveyor belt comprises transverse metal cables.

9. The conveyor according to claim 1, wherein said frame of said conveyor belt comprises a fabric made of plastic material.

10. The conveyor according to claim 1, wherein said support member for supporting said conveyor belt comprises a plurality of sets of rollers, said sets of rollers being distributed along the longitudinal axis of said conveyor belt, each set of rollers comprising at least two rollers arranged about a circumference of said conveyor belt.

11. The conveyor according to claim 10, wherein said support member for supporting said conveyor belt comprises at least ten sets of rollers distributed along the longitudinal axis of said conveyor belt.

12. The conveyor according to claim 10, wherein said sets of rollers are vertically staggered relative to one another along the longitudinal axis of said conveyor belt so as to form a path of travel for said conveyor belt having an upwardly convex longitudinal curve.

13. The conveyor according to claim 10, wherein at least two rollers of said sets of rollers are motorized.

14. The conveyor according to claim 10, wherein each of said sets of rollers comprises at least four rollers distributed about a circumference of said conveyor belt.

15. The belt conveyor according to claim 1, wherein said conveyor belt is configured as a closed loop and has a conveying side and a return side, said conveyor further comprising:
    a first loading station for loading said conveyor side with material to be transported;
    a first unloading station for unloading said conveyor side;
    a second loading station for loading said return side with material to be transported; and
    a second station for unloading said return side.

16. A method of using said conveyor according to claim 1 for crossing an obstacle, comprising placing two of said support stations at adjacent positions along said conveyor belt so that one of said two adjacent support stations is located on each side of the obstacle, said two of said support stations each comprising a support member for supporting said conveyor belt and a framework supported on the ground, said support member being fixed on said framework at a height greater than two meters above the ground.

* * * * *